(12) United States Patent
Lora

(10) Patent No.: US 7,756,774 B1
(45) Date of Patent: Jul. 13, 2010

(54) TICKER-SYMBOL LOOKUP SYSTEM AND METHOD

(75) Inventor: Bolivar Cesar Lora, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 263 days.

(21) Appl. No.: 11/323,707

(22) Filed: Dec. 31, 2005

(51) Int. Cl.
*G06Q 40/00* (2006.01)
(52) U.S. Cl. .......................... 705/37; 705/35; 705/36 R
(58) Field of Classification Search .................... 705/35, 705/36 R, 37
See application file for complete search history.

(56) References Cited

U.S. PATENT DOCUMENTS

| | | | | |
|---|---|---|---|---|
| 4,831,526 | A | 5/1989 | Luchs et al. | 705/4 |
| 5,231,571 | A | 7/1993 | D'Agostino | 705/36 R |
| 6,186,793 | B1 | 2/2001 | Brubaker | 434/107 |
| 6,584,446 | B1 | 6/2003 | Buchanan et al. | 705/4 |
| 6,772,146 | B2 * | 8/2004 | Khemlani et al. | 705/36 R |
| 2001/0021922 | A1 * | 9/2001 | Curtis et al. | 705/35 |
| 2001/0023404 | A1 | 9/2001 | Ogawa et al. | 705/4 |
| 2002/0055862 | A1 | 5/2002 | Jinks | 705/4 |

OTHER PUBLICATIONS

Virtually every bank in Northwest Florida offers online services for customers to take care of their finances at home. Northwest Florida Daily News. Fort Walton Beach, Fla.: Jul. 7, 1996. p. F.1.*
Independent Financial Marketing Group, Inc. Launches Web-Based Financial Planning Services PR Newswire. New York: Jul. 11, 2002. p. 1.*
Wall Street, California; Money Make-Over / Southern California Learning How to Succeed in Personal Finances; Creative Agent Has Made Gains, but Must Curb Spending to Cut Losses; [Home Edition] Jeanette Marantos. Los Angeles Times. Los Angeles, Calif.: Oct. 3, 2000. p. 1.*
www.schwab.com archived webpages viewed via http://web.archive.org/web/*/http://www.schwab.com for Dec. 29, 2005 (accessed Jan. 20, 2007—Internet Archive Wayback Machine).
www.fidelity.com archived webpages viewed via http://web.archive.org/web/*/http://www.fidelity.com for Jan. 4, 2006 (2005 pages not viewable; accessed Jan. 20, 2007—Internet Archive Wayback Machine).
www.smartmoney.com archived webpages viewed via http://web.archive.org/web/*/http://www.smartmoney.com for Dec. 29, 2005 (accessed Jan. 20, 2007—Internet Archive Wayback Machine).
finance.yahoo.com archived webpages viewed via http://web.archive.org/web/*/http://finance.yahoo.com for Dec. 16, 2005 (accessed Jan. 20, 2007—Internet Archive Wayback Machine).
ChoicePoint, Retrieved from web.archive.org using the Internet <URL:http://web.archive.org/web/20020124085629/http://www.choicepoint.net/>, Jan. 24, 2002.
DeSenne, Michael, "The Market Now, It's Not Easy Being in the Green".
Fidelity, "Brokage", archived webpages viewed via http:11web.archive.org/web/*/hnp:11www.fidelitv.com for Jan. 4, 2006 (2005 pages not viewable; accessed Jan. 20, 2007 - Internet Archive Wayback Machine).
Schwab, Charles, "Research Stocks, Make better stock investment decisions", htto:llweb.archive.org/web/*/hnp:llwww.schwab.com for Dec. 29, 2005 (accessed Jan. 20, 2007 - Internet Archive Wayback Machine).
Yahoo! Finance, "WTO Deal Rankles Africa, Caribbean Nations", archived webpages viewed via http:llweb.archive.org/web/*/http://finance. yahoo.com for Dec. 16, 2005 (accessed Jan. 20, 2007 - Internet Archive Wayback Machine).

* cited by examiner

*Primary Examiner*—Lalita M Hamilton
(74) *Attorney, Agent, or Firm*—Chadbourne & Parke, LLP; Walter G. Hanchuk

(57) ABSTRACT

System and method for populating a list with at least one investment vehicle ticker descriptor. A system and method are presented for robustly looking up a ticker symbol for investment vehicle and efficiently adding the ticker symbol to a linked investment list.

17 Claims, 12 Drawing Sheets

FIG. 1

RETIREMENT PLAN QUESTIONNAIRE

Investment and Banking Accounts

| Ticker Symbol Look-Up | |
|---|---|
| Company Name | _____ GO |

— 141

— 140

| Ticker Symbol | Investment Type If No Ticker Symbol | Market Value | Description If "Other" Is Selected as Investment Type | |
|---|---|---|---|---|
| | CD | $ 26,365 | | REMOVE |
| DELL | | $ 31,427 | Dell Computers Inc. | REMOVE |
| | Other — 144 | $ 12,772 | Vanguard Energy — 147 | REMOVE |
| ____ -or- | -Select-_____ ▼ | $ _____ | _____ | ADD |
| | Total | $ 70,564 | | |

| Previous | Return to Index | Save | Next |
|---|---|---|---|

FIG. 2

RETIREMENT PLAN QUESTIONNAIRE
(also showing Preset Inputs for "*Investment Type*")

Investment and Banking Accounts

| Ticker Symbol Look-Up | | |
|---|---|---|
| Company Name | Coca Cola | GO |

— 241

[ → see Table 1 ]

| Ticker Symbol | Investment Type If No Ticker Symbol | Market Value | Description If "Other" Is Selected as Investment Type | |
|---|---|---|---|---|
| | CD | $ 26,365 | | REMOVE |
| DELL | | $ 31,427 | Dell Computers Inc. | REMOVE |
| | Other — 244 | $ 12,772 | Vanguard Energy — 247 | REMOVE |
| | Other — 245 | $ 14,586 | Coca-Cola Co. — 243 | REMOVE |
| ___ - or - | Select- ▼ | $ ___ | ___ | ADD |
| | Checking | $ 85,150 | | |
| | Savings | | | |
| | CD | | — 242 | |
| | Money Market | | | |
| | Savings Bond | | | |
| | Other | | | |

246 —

| Previous | Return to Index | Save | Next |

FIG. 4

FINANCIAL PLANNING QUESTIONNAIRE

Savings, Investment and Retirement Accounts

Please provide details for the following account

| | |
|---|---|
| Account Description: | Jane's 401K |
| Type of Retirement Plan: | - Select - ▼ |
| Account Owner: | - Select - ▼ |
| Are any contributions made to this account? | - Select - ▼ |
| Contribution: | $ _____ |
| Pre-Tax Contribution: | $ _____ |
| Post-Tax Contribution: | $ _____ |
| Employer Contribution: | $ _____ |

Please enter your investments

Provide information about each investment you have in this account. Examples of these investments are stocks, mutual funds, bonds, cash, etc.

| Investment | Description or Ticker Symbol | Market Value | |
|---|---|---|---|
| Other | CD | $ 26,365 | DELETE |
| Stock/Mutual Fund | DELL – DELL INC | $ 31,427 | DELETE |
| Stock/Mutual Fund | VGENX – VANGUARD ENERGY ⟵ 449 | $ 12,772 | DELETE |
| -Select- ▼ | | $ _____ | ADD |

448 ⟵ For stocks and mutual funds you may enter a partial description and system will automatically search for ticker symbol and company name. For other types of holdings, please provide complete description.

Total Market Value  $ 70,564

If you need assistance, our financial planning associates are available Monday – Friday from 8 a.m. to 7 p.m. CT at 1 – 800 – $&% – §+☉☺

| Cancel | Done with this account |
|---|---|

FIG. 5

Preset Inputs for "*Type of Retirement Plan*" of FIG. 4

Savings, Investment and Retirement Accounts

<u>Please provide details for the following account</u>

| | | |
|---|---|---|
| *Account Description:* | Jane's 401K | |
| *Type of Retirement Plan:* | - Select - ▼ | |
| *Account Owner:* | Traditional IRA | |
| *Are any contributions made to this account?* | Roth IRA | |
| *Contribution:* | 401k Retirement Plan | |
| *Pre-Tax Contribution:* | 403b Retirement Plan | |
| *Post-Tax Contribution:* | 457 Retirement Plan | |
| *Employer Contribution:* | SEP/SIMPLE IRA | |
| Please enter your Investments | Keogh | ⎯ 542 |
| Provide information about each investm investments are stocks, mutual funds, b | Thrift Savings Plan | Examples of these |

| *Investment* | *Description or Ticker Symbol* | *Market Value* | |
|---|---|---|---|
| Other | CD | $ 26,365 | DELETE |
| Stock/Mutual Fund | DELL – DELL INC | $ 31,427 | DELETE |
| Stock/Mutual Fund | VGENX – VANGUARD ENERGY | $ 12,772 | DELETE |
| -Select- ▼ | | $ | ADD |
| | For stocks and mutual funds you may enter a partial description and system will automatically search for ticker symbol and company name. For other types of holdings, please provide complete description. | | |
| | Total Market Value | $ 70,564 | |

If you need assistance, our financial planning associates are available Monday – Friday from 8 a.m. to 7 p.m. CT at 1 – 800 – $&% – §+☺☻

| Cancel | Done with this account |
|---|---|

FIG. 6

Examples of Linked Inputs for "*Account Owner*" of FIG. 4

Savings, Investment and Retirement Accounts

<u>Please provide details for the following account</u>

| | |
|---|---|
| *Account Description:* | Jane's 401K |
| *Type of Retirement Plan:* | - Select - ▼ |
| *Account Owner:* | - Select - ▼ |
| *Are any contributions made to this account?* | (Joe Smith) — 642 |
| *Contribution:* | (Jane Smith) |
| *Pre-Tax Contribution:* | $ _____ |
| *Post-Tax Contribution:* | $ _____ |
| *Employer Contribution:* | $ _____ |

<u>Please enter your investments</u>

Provide information about each investment you have in this account. Examples of these investments are stocks, mutual funds, bonds, cash, etc.

| *Investment* | *Description or Ticker Symbol* | *Market Value* | |
|---|---|---|---|
| Other | CD | $ 26,365 | DELETE |
| Stock/Mutual Fund | DELL – DELL INC | $ 31,427 | DELETE |
| Stock/Mutual Fund | VGENX – VANGUARD ENERGY | $ 12,772 | DELETE |
| -Select- ▼ | | $ _____ | ADD |

For stocks and mutual funds you may enter a partial description and system will automatically search for ticker symbol and company name. For other types of holdings, please provide complete description.

Total Market Value  $ 70,564

If you need assistance, our financial planning associates are available Monday – Friday from 8 a.m. to 7 p.m. CT at 1 – 800 – $&% – §+☉Ə

| Cancel | Done with this account |
|---|---|

FIG. 7

Preset Inputs for "*Are any contributions made to this account?*" of FIG. 4

Savings, Investment and Retirement Accounts

Please provide details for the following account

| | |
|---|---|
| *Account Description:* | Jane's 401K |
| *Type of Retirement Plan:* | - Select - ▼ |
| *Account Owner:* | - Select - ▼ |
| *Are any contributions made to this account?* | - Select - ▼ |
| *Contribution:* | No |
| *Pre-Tax Contribution:* | Yes – Monthly          ← 742 |
| *Post-Tax Contribution:* | Yes – Annually |
| *Employer Contribution:* | $ _____ |

Please enter your investments

Provide information about each investment you have in this account. Examples of these investments are stocks, mutual funds, bonds, cash, etc.

| Investment | Description or Ticker Symbol | Market Value | |
|---|---|---|---|
| Other | CD | $ 26,365 | DELETE |
| Stock/Mutual Fund | DELL – DELL INC | $ 31,427 | DELETE |
| Stock/Mutual Fund | VGENX – VANGUARD ENERGY | $ 12,772 | DELETE |
| -Select- ▼ | _____ | $ _____ | ADD |

For stocks and mutual funds you may enter a partial description and system will automatically search for ticker symbol and company name. For other types of holdings, please provide complete description.

Total Market Value $ 70,564

If you need assistance, our financial planning associates are available Monday – Friday from 8 a.m. to 7 p.m. CT at 1 – 800 – $&% – §+☯

| Cancel | Done with this account |
|---|---|

FIG. 8

Preset Inputs for "*Investment*" of FIG. 4

Savings, Investment and Retirement Accounts

Please provide details for the following account

| | |
|---|---|
| *Account Description:* | Jane's 401K |
| *Type of Retirement Plan:* | - Select - ▼ |
| *Account Owner:* | - Select - ▼ |
| *Are any contributions made to this account?* | - Select - ▼ |
| *Contribution:* | $ _____ |
| *Pre-Tax Contribution:* | $ _____ |
| *Post-Tax Contribution:* | $ _____ |
| *Employer Contribution:* | $ _____ |

Please enter your investments

Provide information about each investment you have in this account. Examples of these investments are stocks, mutual funds, bonds, cash, etc.

| *Investment* | *Description or Ticker Symbol* | *Market Value* | |
|---|---|---|---|
| Other | CD | $ 26,365 | DELETE |
| Stock/Mutual Fund | DELL – DELL INC | $ 31,427 | DELETE |
| Stock/Mutual Fund | VGENX – VANGUARD ENERGY — 849 | $ 12,772 | DELETE |
| -Select- ▼ | | $ _____ | ADD |

Dropdown options (846):
- Stock/Mutual Fund
- Individual Bond
- Cash/Money Market
- Savings Bond
- Fixed Annuity
- Other

— 842

For stocks and mutual funds you may enter a partial description and system will automatically search for ticker symbol and company name. For other types of holdings, please provide complete description.

850

Total Market Value  $ 70,564 e, our financial planning associates are available Monday – Friday CT at 1 – 800 – $&% – §+☉☾

[ Cancel ]  [ Done with this account ]

FIG. 9

FINANCIAL PLANNING QUESTIONNAIRE

Savings, Investment and Retirement Accounts

RESULTS PAGE: Select Ticker Symbol – Click on the correct ticker symbol.
If you do not see the correct symbol, try modifying the company name.

| Ticker Symbol | Company/Mutual Fund Name/Description |
|---|---|
| VGELX | VANGUARD ENERGY FUND ADMIRAL SHARES |
| VGENX — 951 | VANGUARD ENERGY FUND INVESTOR SHARES |
| VENAX | VANGUARD ENERGY INDEX FUND ADMIRAL SHARES |
| VDE | VANGUARD ENERGY VIPERS |

If the maximum allowable number of symbols (45) have been returned, you may wish to narrow your search to find the symbol you're looking for.

952
Modify Search: vanguard energy    [Search]

If you are not able to locate a ticker symbol, click the "Return" button, select "Other" for Investment Type and enter a detailed description of the holding. If you need assistance, our financial planning associates are available Monday-Friday from 8 a.m. to 7 p.m. CT at 1 – 800 – $&% – §+☉3

[RETURN]

FIG. 10

FINANCIAL PLANNING QUESTIONNAIRE

Savings, Investment and Retirement Accounts

RESULTS PAGE: Select Ticker Symbol – Click on the correct ticker symbol.
If you do not see the correct symbol, try modifying the company name.

| Ticker Symbol | Company/Mutual Fund Name/Description |
| --- | --- |
| COKE | COCA COLA BOTTLING CO CONS |
| KO —1053 | COCA COLA CO |
| CCE | COCA COLA ENTERPRISES |
| KOF | COCA COLA FEMSA SA DECV |
| CCH | COCA COLA HELLENIC BOTTLING CO SA |

If the maximum allowable number of symbols (45) have been returned, you may wish to narrow your search to find the symbol you're looking for.

1052

Modify Search: coca cola    [ Search ]

If you are not able to locate a ticker symbol, click the "Return" button, select "Other" for Investment Type and enter a detailed description of the holding. If you need assistance, our financial planning associates are available Monday-Friday from 8 a.m. to 7 p.m. CT at 1 – 800 – $&% – §+☉☻

[ RETURN ]

FIG. 11

FINANCIAL PLANNING QUESTIONNAIRE

Savings, Investment and Retirement Accounts

Please provide details for the following account

| | |
|---|---|
| *Account Description:* | Jane's 401K |
| *Type of Retirement Plan:* | - Select - ▼ |
| *Account Owner:* | - Select - ▼ |
| *Are any contributions made to this account?* | - Select - ▼ |
| *Contribution:* | $ _____ |
| *Pre-Tax Contribution:* | $ _____ |
| *Post-Tax Contribution:* | $ _____ |
| *Employer Contribution:* | $ _____ |

Please enter your investments

Provide information about each investment you have in this account. Examples of these investments are stocks, mutual funds, bonds, cash, etc.

| *Investment* | *Description or Ticker Symbol* | *Market Value* | |
|---|---|---|---|
| Other | CD | $ 26,365 | DELETE |
| Stock/Mutual Fund | DELL – DELL INC | $ 31,427 | DELETE |
| Stock/Mutual Fund | VGENX – VANGUARD ENERGY —1149 | $ 12,772 | DELETE |
| Stock/Mutual Fund | KO – COCA COLA CO —1153 | $ 14,586 | DELETE |
| -Select- ▼ | | $ _____ | ADD |

For stocks and mutual funds you may enter a partial description and system will automatically search for ticker symbol and company name. For other types of holdings, please provide complete description.

Total Market Value $ 85,150

If you need assistance, our financial planning associates are available Monday – Friday from 8 a.m. to 7 p.m. CT at 1 – 800 – $&% – §+☉϶

| Cancel | Done with this account |
|---|---|

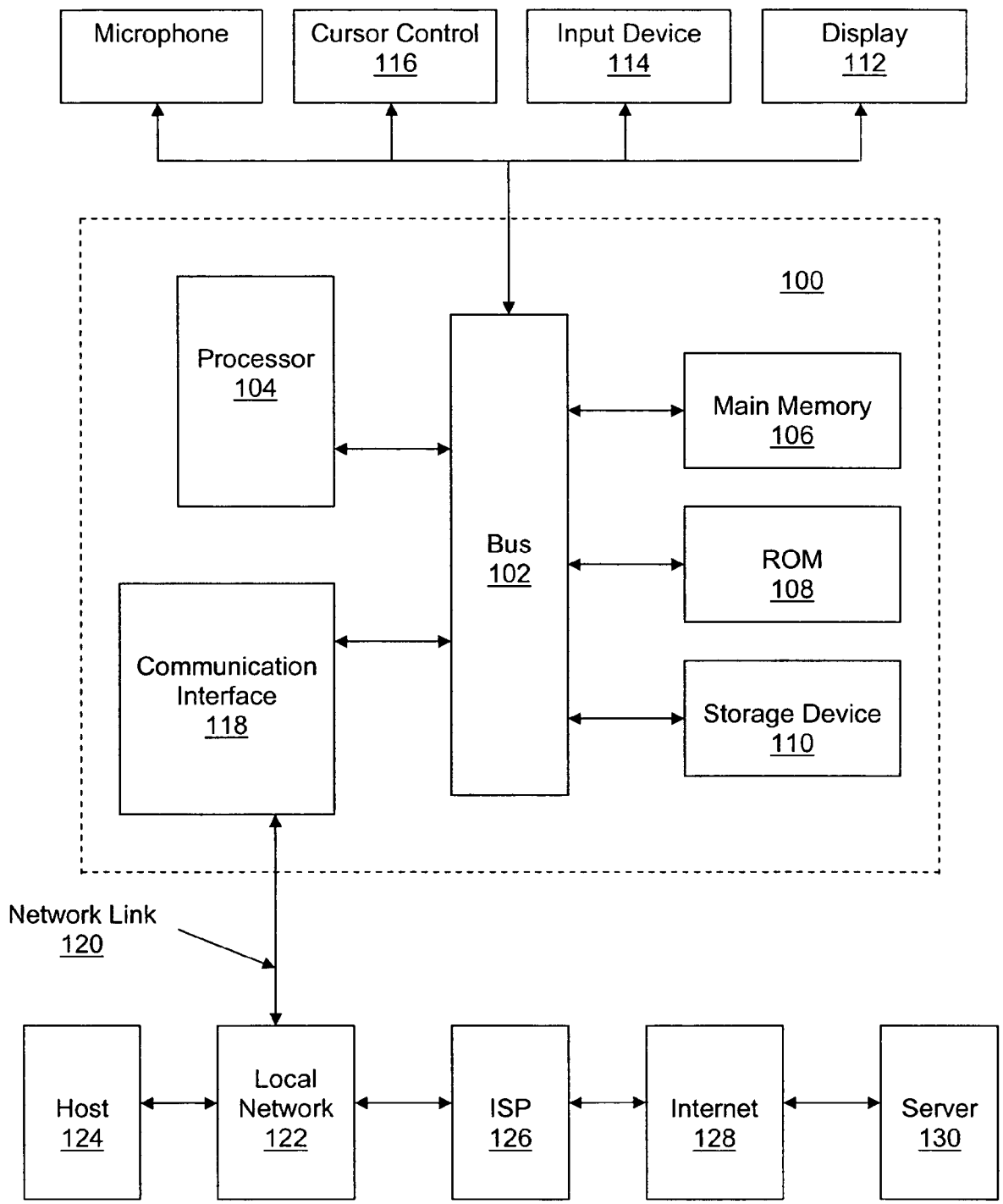

TICKER-SYMBOL LOOKUP SYSTEM AND METHOD

CROSS-REFERENCE TO RELATED APPLICATIONS

This application is related to the following co-pending applications, which are each hereby incorporated by reference in their entirety: U.S. patent application Ser. No. 11/323,706, entitled TICKER-SYMBOL LOOKUP SYSTEM AND METHOD, by Bolivar C. Lora, filed Dec. 31, 2005, and U.S. patent application Ser. No. 11/323,875, entitled TICKER-SYMBOL LOOKUP SYSTEM AND METHOD, by Bolivar C. Lora, also filed Dec. 31, 2005.

TECHNICAL FIELD

The disclosed embodiments relate generally to a system and method for populating a list with ticker symbols or other descriptors for investment vehicles.

BACKGROUND

A stock ticker is a scrolling display of current or recent security prices and trading volumes. Ticker symbols composed of only a few letters are widely used in the United States to identify shares of common stocks on a stock ticker. Ticker symbols are also used to identify securities of mutual funds and exchange traded funds (ETFs), as well as some options and some market indices.

Securities identified by one- or two-letter ticker symbols are traded on the New York Stock Exchange (NYSE), securities identified by three letter ticker symbols are traded on either the NYSE or American Stock Exchange (AMEX), and securities identified by four- and five-letter ticker symbols are traded on the NASDAQ (an electronic stock market originally known as the "National Association of Securities Dealers Automated Quotations").

Securities identified by five-letter ticker symbols are usually in a special class, i.e., something other than a common stock. For example, ticker symbols for mutual funds must be five letters long and end in the letter "X".

Securities of companies in bankruptcy are identified with a ticker symbol having the letter "Q" added as the last letter. In addition, securities of companies having ticker symbols that end in a period (".") followed by the letters "PK" are "pink sheet" companies, which, with the exception of a few foreign issuers, tend to be closely held, extremely small or thinly traded.

Creating an investment list at a web page (e.g., of a financial services company) is generally a ticker-symbol-dependent process. For example, in order to complete a list of target investments (e.g., as in a watchlist of prospective investments) or a list of actual investments (e.g., as in investment list 140 of the "Retirement Plan Questionnaire" of FIG. 1), an investor typically enters a ticker symbol for each company or mutual fund represented in his/her potential target portfolio (as in the case of a watchlist of prospective investments) or his/her actual portfolio (as in the case of a "Retirement Plan Questionnaire" of FIG. 1).

Entering a ticker symbol for a company or a mutual fund in an investment list frequently presents a difficulty for an investor who knows one or more words in the name of the company or mutual fund, but who does not know the ticker symbol for securities of that company or mutual fund. An example would be an investor knows that the words "Coca Cola" are part of the name of a company in his/her portfolio of equity securities, but who does not know the ticker symbol for that company's securities. Mutual funds are similarly the subject matter of this situation. An example would be an investor who readily identifies a mutual fund in which he/she holds a position by words in the name of the mutual fund (e.g., "Vanguard Energy") but who does not know the five-letter ticker symbol for that mutual fund (e.g., "VGENX" for Vanguard Energy Fund Investor Shares).

In order to help investors generate accurate investment lists, websites of many financial services companies provide a "Symbol Lookup" button (or the like). The operation of an associated ticker symbol lookup tool is generally straightforward. For example, if an investor types "Coca Cola" into a tool's "Symbol Lookup" field and then selects the adjacent "Lookup" button (or a similar action button), an output of companies and ticker symbols similar to the output noted in Table 1 is returned. Depending on the ticker symbol database utilized by the ticker symbol lookup tool, the ticker symbol for one or more pink sheet securities might also be returned. Pink sheet securities for "Coca Cola" companies are listed in Table 2.

TABLE 1

Ticker Symbols for Companies Having "Coca Cola" in Their Name

| Company Name | Ticker Symbol |
| --- | --- |
| Coca-Cola Bottling Company Consolidated | COKE |
| Coca-Cola Company, The | KO |
| Coca-Cola Enterprises, Inc. | CCE |
| Coca-Cola FEMSA, S.A. de C.V. | KOF |
| Coca-Cola Hellenic Bottling Company, S.A. | CCH |

After reviewing company names and ticker symbols (or other related information) in an output like that of Table 1, the investor may identify the ticker symbol that represents the "Coca Cola" company that is part of his/her portfolio. For example, after reviewing the individual company names and ticker symbols of Table 1, the investor may realize that he/she owns shares of The Coca-Cola Company, which has "KO" as its ticker symbol. The investor may then copy the ticker symbol "KO" from the output of the ticker symbol lookup tool into a "Ticker Symbol" field of his/her list of actual investments.

FIG. 1 represents a web page (i.e., Retirement Plan Questionnaire) similar to one previously used by a financial services company to help account holders summarize investment and banking accounts. The page includes a traditional ticker symbol lookup tool 141. FIG. 2 is a Retirement Plan Questionnaire similar to the one depicted in FIG. 1. FIG. 2 depicts preset inputs on drop-down menu 242 that appears if "Select" is chosen under Investment Type. "Other" at 246 is the last choice on drop-down menu 242. A position in "Coca-Cola Co.," as entered at 243 under the Description heading, is listed as an "Other" Investment Type at 245 in FIG. 2 (this position has been added in a fourth row versus the investment list 140 of FIG. 1).

Unlike the investor who reviewed an output like that of Table 1, another investor may bypass using a ticker symbol lookup tool. The fourth row under Investment Type in the Retirement Plan Questionnaire in FIG. 2 provides a likely example. The investor who completed this form selected "Other" at 245 in FIG. 2 as describing the Investment Type for his/her position in a Coca-Cola® company. The selection of "Other" allows an investor to complete an entry row in the Questionnaire without entering a ticker symbol.

The selection of "Other" may be made for a variety of reasons. For example, the investor may own "pink sheet" securities of a Coca-Cola® company, and, because "pink sheet" securities typically are only thinly traded (and often not included in the output of ticker symbol lookup tools), the investor may decide to bypass using the ticker symbol lookup tool. The investor may simply want to avoid entering a ticker symbol for a "pink sheet" security. By selecting "Other" under Investment Type, the investor can avoid such an entry.

TABLE 2

Ticker Symbols for "Pink Sheet" "Coca Cola" Companies

| Company Name | Ticker Symbol |
| --- | --- |
| COCA COLA AMATIL LTD | CCLAF.PK |
| COCA COLA AMATIL LTD | CCLAY.PK |
| COCA COLA FEMSA SA D | COCSF.PK |
| COCA COLA HELLENIC | CCHOF.PK |
| COCA COLA HELLENIC | CCHBF.PK |
| COCA COLA JAPAN CO | CCOJF.PK |
| COCA COLA WEST JAPAN | CCWJF.PK |
| COLAS SA BOULOGNE | COABF.PK |
| PANAMA COCA COLA BOT | PCOK.PK |

For this or variety of other possible reasons, the investor who completed the Retirement Plan Questionnaire of FIG. 2 either did not use ticker symbol lookup tool 241, or, if he/she did use the tool, he/she did not copy the ticker symbol for the "Coca Cola" company in which he/she held an equity position into the separate investment list in the Questionnaire. The investor instead selected "Other" at 245 under Investment Type and entered "Coca-Cola Co." at 243 under Description. Each field under Description in FIGS. 1 and 2 is a text input field when "Other" is selected under Investment Type.

Many types of ticker symbol lookup tools are available other than tools 141 and 241 of FIGS. 1 and 2, respectively. For example, an "Auto Ticker Suggest" tool (set to "Company Name" with "Exact Match" checked) available through an "Advanced Search" link at www.smartmoney.com creates an alphabetical scroll of candidate company names (and assigned ticker symbols) on entry of candidate letters for a company name into the "Search Term" field of the tool.

If a user enters the letters "COC" using the "Company Name" option in the "Search Term" field of such an "Auto Ticker Suggest" tool (with "Exact Match" checked) in order to look up the ticker symbol for The Coca-Cola Company, nine company names (and their assigned ticker symbols) as noted in Table 3 are returned in alphabetical order on a drop-down scroll.

TABLE 3

Company Names (and Assigned Ticker Symbols) Returned in a Scroll on Entry of "COC" in an "Auto Ticker Suggest" Tool
Company Name (Ticker Symbol)

COCA COLA AMITIL LTD (CCLAY)
COCA COLA BOTTLING CL CM (COKE)
COCA COLA HELLENIC BTTLG (CCH)
COCA-COLA CO (KO)
COCA-COLA ENTERPRISES INC. (CCE)
COCA-COLA FEMSA SA DE CV (KOF)
COCONUT PALM ACQUISITION CORP (CNUT)
COCONUT PALM ACQUISITION WTS (CNUTW)
COCOPHILIPS W/I (COP#)

The Coca-Cola Company (ticker symbol: KO) appears in this output. If an investor has an equity position in The Coca-Cola Company (ticker symbol: KO), an investor must copy the "KO" ticker symbol from the drop-down scroll and re-enter it into his/her separate investment list (e.g., in order to complete a ticker symbol entry in a Questionnaire like that of FIG. 1).

A novice investor may naively consider short key words in a company name (e.g., "COCA COLA") to be ticker symbols. Such a novice investor may input "COCA COLA" into an "Enter Symbol(s)" field of a quote tool available on a web page (e.g., of a financial services company). After selecting an adjacent "GO" button (or "SEARCH" or "LOOKUP" button or the like), he/she likely will be met with responses like those given by quote tools at finance.yahoo.com, www.schwab.com and www.fidelity.com (Table 4). Each of these quote tools interprets "COCA COLA" as representing ticker symbols for two separate companies.

TABLE 4

Responses on Entering "COCA COLA" into "Enter Symbol(s)" Field

| Response through | Line | Message |
| --- | --- | --- |
| finance.yahoo.com | 1 | 'coca' is no longer valid. It has changed to COCA.PK. |
| | 2 | No such ticker symbol. Look up symbol for "cola" |
| www.schwab.com | 1 | Coastcast Corporation Co. |
| | 2 | There is no information for this symbol. |
| www.fidelity.com | 1 | Unknown symbols. You may look up the symbols. |
| | 2 | — |

Similarly, a novice investor who enters "Coca-Cola" (i.e., who includes a hyphen ("-") between the words "Coca" and "Cola") into an "Enter Symbol(s)" field of a quote tool likely will be met with responses like those generated through finance.yahoo.com, www.schwab.com and www.fidelity.com (Table 5).

TABLE 5

Responses on Entering "COCA-COLA" into "Enter Symbol(s)" Field

| Response through | Line | Message |
| --- | --- | --- |
| finance.yahoo.com | 1 | Invalid Ticker Symbol |
| | 2 | 'coca-cola' is not a valid ticker symbol. |
| www.schwab.com | 1 | No information is available for COCA-COLA. |
| | 2 | — |
| www.fidelity.com | 1 | Unknown symbol. You may look up the symbol. |
| | 2 | — |

In short, these quote tools require that valid ticker symbols be entered and submitted in order to provide price information on investments to which the corresponding ticker symbols are assigned. These quote tools are not robust in that they do not also return price information on the entry and submission of key words in the name of the investment (e.g., "Coca Cola") except in so far as these words are taken to be stock ticker symbols. That is, these quote tools are not both ticker-symbol-based and investment-name-based lookup tools.

Many account holders of financial services companies often fail accurately to complete ticker-symbol entries on an investment list (particularly for mutual funds) despite the ready availability of ticker symbol lookup tools. Rather then use a ticker symbol lookup tool to find the ticker symbol assigned to a mutual fund, some account holders, in completing a Retirement Plan Questionnaire like the ones of FIGS. 1 and 2, may select "Other" (e.g., as in the third row entries at 144 and 244 under Investment Type of FIGS. 1 and 2, respectively, and the fourth row entry at 245 of FIG. 2; see also the last preset input 246 in the Investment Type drop-down menu 242 of FIG. 2) and enter a name (often incomplete) under the Description column for a mutual fund in which the account holder has a position.

For example, the account holder(s) who completed the Questionnaires of FIGS. 1 and 2 selected "Other" at 144 and 244, respectively, and entered "Vanguard Energy" at 147 and 247, respectively, under Description rather than entering under Ticker Symbol a ticker symbol for the "Vanguard Energy" fund that he/she owns. But the Vanguard® Group manages at least three "Vanguard Energy" mutual funds, as well as shares of an ETF (exchange traded fund) referred to as Vanguard Energy VIPERs (ticker symbol: VDE) (Table 6). The account holder's entries in the Questionnaires depicted in FIGS. 1 and 2 do not uniquely identify the "Vanguard Energy" fund in which the investor has a position.

TABLE 6

Ticker Symbols for "Vanguard Energy" Funds

| Fund Name | Ticker Symbol |
| --- | --- |
| Vanguard Energy Fund Admiral Shares | VGELX |
| Vanguard Energy Fund Investor Shares | VGENX |
| Vanguard Energy Index Fund Admiral Shares | VENAX |
| Vanguard Energy VIPERs | VDE |

Similarly, consider an unmotivated account holder who, on completing a Retirement Plan Questionnaire similar to the ones depicted in FIGS. 1 and 2, indicates an equity position in a "cola" company by both selecting "Other" for Investment Type and entering under Description "the cola company." This account holder has not made clear whether he/she is describing an equity position in The Coca-Cola Company (ticker symbol: KO), one of the many other companies that sell COCA-COLA® products (see Tables 1 and 2), or a competitor company such as the Pepsi Bottling Group Inc. (ticker symbol: PBG).

The accurate completion of some retirement or financial planning questionnaires (or like forms) could be of such importance that a financial services company providing the questionnaires may find it necessary to dedicate several employees to the task of reviewing the descriptions that account holders provide when they submit "Other" as identifying an Investment Type in a questionnaire. For example, if an account holder made an ambiguous or inapposite Description entry when using "Other" to identify the Investment Type in a Questionnaire like the ones of FIGS. 1 and 2, an employee of the financial services company could be required to find and communicate with the account holder in order to clarify that entry.

However, finding and communicating with potentially many account holders in order to clarify entries made in association with selecting an entry of "Other" on questionnaires is a resource-draining "backroom" operation. In addition, a company who pursues such an operation could run a risk of being perceived as intrusive toward account holders (by often communicating with account holders in order to clarify form entries).

In view of the foregoing, a need exists for improved systems and methods to assist account holders and other users complete ticker-symbol-based investment lists (e.g., for retirement plan questionnaires or financial planning questionnaires) accurately and efficiently.

SUMMARY

In general, the disclosed embodiments are related to a system and method for robustly looking up a ticker symbol of a security (e.g., of a company, mutual fund or ETF) or an option, wherein the system or method includes adding efficiently the ticker symbol (or name of the investment or both the ticker symbol and the name of the investment) to a linked investment list. In being both robust in ticker symbol lookup capabilities, as well as efficient in adding ticker symbols or names of an investment to a linked investment list, various embodiments enable account holders (or other users) to generate accurate investment lists with relative ease.

BRIEF DESCRIPTION OF THE DRAWINGS

A more complete appreciation of the disclosed embodiments and their attendant advantages will be readily obtained and better understood by reference to the following detailed description when considered in conjunction with the accompanying drawings (it being understood that the drawings contained herein are not necessarily drawn to scale); wherein:

FIG. 1, previously described in part, represents a web page (i.e., Retirement Plan Questionnaire) similar to one previously used by a financial services company to help account holders summarize investment and banking accounts; the page includes traditional ticker symbol lookup tool 141;

FIG. 2, previously described in part, depicts preset inputs on drop-down menu 242 that appears if "Select" is chosen under Investment Type in a Retirement Plan Questionnaire similar to the one depicted in FIG. 1;

FIG. 4 represents a web page (i.e., Financial Planning Questionnaire) wherein the user is notified of the operation of an integrated robust lookup tool at 448;

FIGS. 5-8 depict drop-down menus if "Select" is chosen for Type of Retirement Plan (FIG. 5), Account Owner (FIG. 6), Are any contributions made to this account? (FIG. 7) or Investment (FIG. 8) headers, respectively, in web pages like the one of FIG. 4;

FIGS. 9 & 10 represent examples of a web pages (i.e., Results Pages) that are returned on submitting "vanguard energy" (FIG. 9) or "coca cola" (FIG. 10) from the data entry field under Description or Ticker Symbol in FIG. 4 through activating the integrated robust lookup tool by selecting the adjacent "ADD" button;

FIG. 11 illustrates a web page (i.e., Financial Planning Questionnaire) like that of FIG. 4 except that the user has entered a position in the stock of The Coca Cola Company (ticker symbol: KO) in the fourth row under Investment and Description or Ticker Symbol; and FIG. 12 illustrates a computer system upon which an embodiment may be implemented.

DETAILED DESCRIPTION

Figure 3:
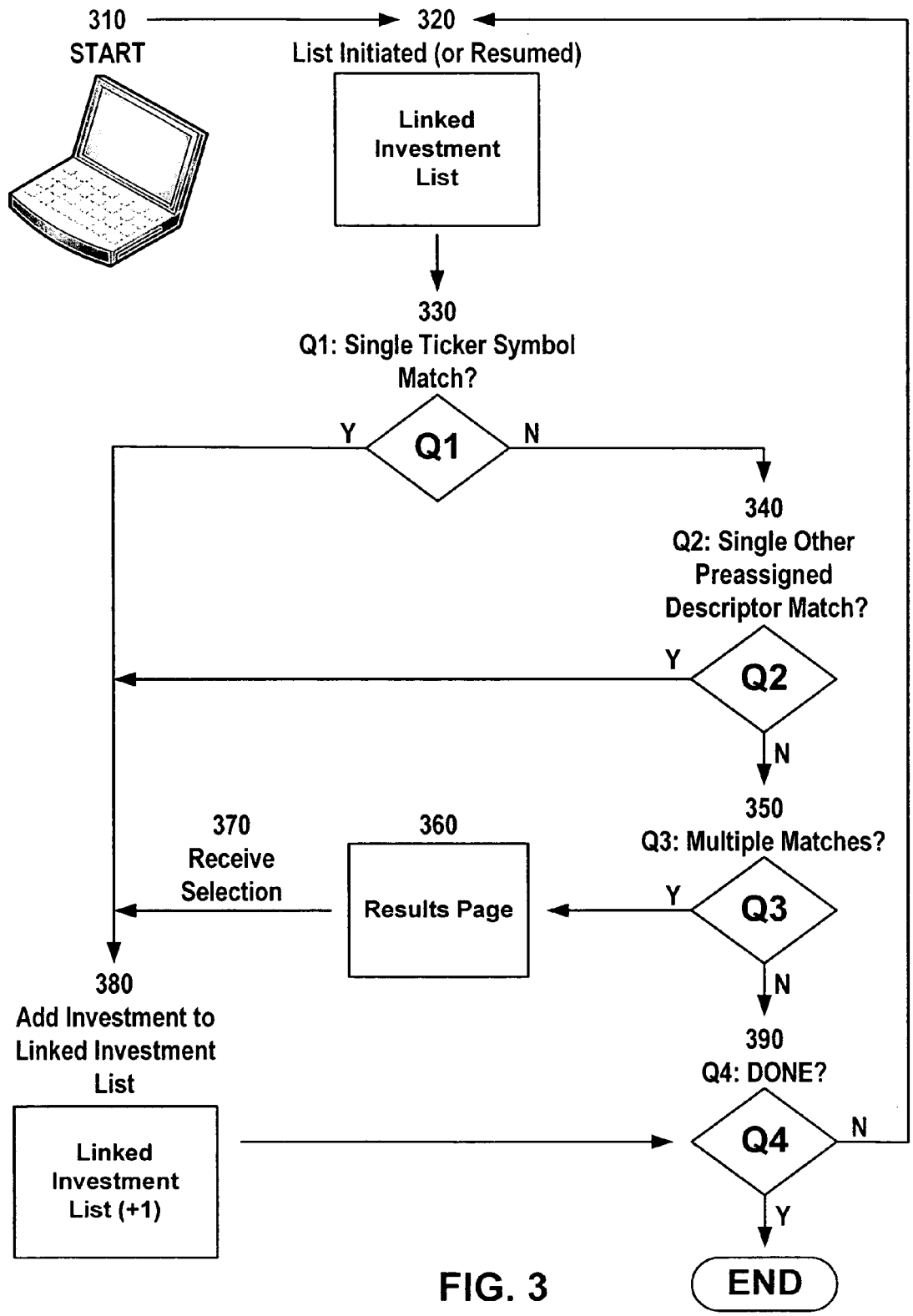
FIG. 3 is a flow diagram illustrating an embodiment.

Referring to FIGS. 1 and 2, these figures represent web pages of Retirement Plan Questionnaires similar to ones previously used by a financial services company. Referring to FIG. 1, the user who completed this Retirement Plan Questionnaire has selected "Other" at 144 for entry of a $12,772 position in "Vanguard Energy." Without a ticker symbol, whether the user is referring to shares in a company named "Vanguard Energy" or to one of several mutual funds in the Vanguard® Group that includes the words "Vanguard Energy" in the mutual fund name is not clear (see also Table 6). Referring to FIG. 2, the user who completed the Retirement Plan Questionnaire has similarly selected "Other" at 245 for entry of a $14,586 position in "Coca-Cola Co." at 243. Without a ticker symbol, the "Coca-Cola" company to which the user is referring is not clear.

FIG. 3 is a flow diagram illustrating an embodiment where at START 310 a computer system responds to a user opening a form (i.e., typically online) for, at 320, initiating (or resuming) the building of a linked investment list in which identification of investments is based in part on ticker symbols.

In the embodiment depicted in FIG. 3, in an initial creating of an investment list, or in a resumption in its building, the computer system accepts entry of, at 320 (from a user's input in a data entry field for Description or Ticker Symbol or the like), an investment's ticker symbol or key words in the name of the investment (e.g., name of the company, mutual fund or ETF, or, in some embodiments, option name). At 330, the computer system then evaluates whether the input matches a single ticker symbol (Q1). More specifically, after the computer system accepts data entered from a data entry field (e.g., on acceptance of the selection of an "ADD" button adjacent to the data entry field), the computer system searches one or more investment vehicle databases with the input data. The search identifies matching valid ticker symbols. The computer system may accomplish simultaneously or subsequently (or have accomplished previously) another search, which is diagrammed at 340, for other matching preassigned descriptors, e.g., key words that occur in the name of the investments that are stored in one or more investment vehicles databases. That is, at 340, the computer system evaluates whether the input matches only a single other preassigned descriptor (Q2).

If the search(es) in the one or more investment vehicle databases result(s) in a match to only one corresponding valid ticker symbol (i.e., Q1=YES), the computer system adds the ticker symbol or the name of the investment represented by the ticker symbol (e.g., the name of the company, mutual fund, ETF or, in some embodiments, option) or both to a linked investment list of the user (e.g., in a Financial Planning Questionnaire) at 380. In this manner, a computer system would have likely added the "ticker symbol—company" pair "DELL—DELL INC" to the linked investment list represented in the Questionnaire of FIG. 4. In various embodiments, the computer system also adds other information at 380 (i.e., information in addition to the ticker symbol and the name of the investment represented by the ticker symbol) to the user's linked investment list where a user has also submitted that other information to the computer system (e.g., the market dollar value, or number of shares, in a position of the user).

If, at 330, the search(es) in the one or more investment vehicle databases do(es) not result in a match to only a single ticker symbol (i.e., Q1=NO), the computer system queries, at 340, whether the input matches only a single other preassigned descriptor of one investment (e.g., key word in the name of the investment) (Q2). If additional (or simultaneous or previously accomplished) search(es) in the one or more investment vehicle databases result(s) in a match to a only a single other preassigned descriptor of an investment (i.e., Q2=YES), the computer system adds the name of the matching investment (e.g., company, mutual fund or ETF name, or, in some embodiments, option name) or its ticker symbol or both the name of matching investment and its ticker symbol to the user's linked investment list at 380.

If, at 340, the search(es) by the computer system of one or more investment vehicle databases do(es) not result in only a single other preassigned descriptor for an investment being returned (i.e., Q2=NO), the computer system assesses at 350 whether multiple matches to investment vehicles may be (or were) obtained. If, at 350, the computer system identifies multiple matches to ticker symbols or to other preassigned descriptors (e.g., numbers of the Committee for Uniform Security Identification Procedures (CUSIP) for an option or a security of a company, mutual fund or ETF, or key words in the name of the company, mutual fund, ETF or option) (i.e., Q3=YES), the computer system provides these multiple matches to a user (e.g., in a results page at 360). The computer system may then receive a selection by the user at 370 of a ticker symbol (or name) of an investment displayed on Results Page 360 corresponding to a position in an actual or target portfolio of the user. The computer system then adds, at 380 in a manner responsive to the selection received at 370, the name of the selected investment (e.g., the name of the company, mutual fund, ETF or, in some embodiments, option) or its ticker symbol or both the name of selected investment and its ticker symbol to the linked investment list of the user, which forms a linked investment list (+1).

From 350 (i.e., Q3=NO) or 380, execution proceeds to 390 (Q4=DONE?). At 390, building of the linked investment list may resume at 320 (i.e., Q4=NO), or, if the computer system receives an input such as "DONE with this account" (or the like) (i.e., Q4=YES), building of the linked investment list ends.

Therefore, the described ticker symbol lookup tool or quote tool allows, with one tool, each of the following: A) valid ticker symbol(s) to be submitted using the tool, and information on corresponding investment(s) to be routinely returned, or, B) key word(s) in the name of the investment (e.g., company or mutual fund) or other descriptor(s) (e.g., CUSIP numbers) to be submitted using the tool, and information on corresponding investment(s) (including, in some embodiments of such tools, the ticker symbol of the investment) to be routinely returned, or, C) in some embodiments of such tools wherein multiple matches are made, a list of candidate investments (wherein each candidate investment is identified by ticker symbol or investment name or both) to be routinely returned. In the context of various robust ticker symbol lookup tool embodiments, a "ticker descriptor" is understood to include a valid ticker symbol for an investment vehicle and key words in the name of the investment vehicle. An "enhanced ticker descriptor" also includes CUSIP numbers for the investment or investment vehicle.

In contrast, the previously-noted "Auto Ticker Suggest" tool available through www.smartmoney.com operates under only one lookup option. For example, when the "Auto Ticker Suggest" tool is activated under the "Company Name" option, it does not routinely match ticker symbol entries (it only matches ticker symbol entries when these ticker symbols are incidentally part of a company name). Similarly, when the "Auto Ticker Suggest" tool is activated under the "Stock [ticker symbol]" option, it does not routinely match entries of company names (it then only matches company names when these company names are incidentally also stock ticker symbols). In short, the tool does not operate so as routinely to process both investment-name-based searches and ticker-symbol-based searches.

Furthermore, the scrolled output of the previously-noted "Auto Ticker Suggest" tool is not linked to, or integrated into, an investment list. For example, if the ticker symbol "KO" (or the text "COCA-COLA CO") is listed in a returned drop-down scroll, the ticker symbol "KO" is not added directly by the tool to a linked investment list, and an investor cannot simply select (e.g., place a mouse click on) the ticker symbol "KO" (or the text "COCA-COLA CO") in this scroll in order to add The Coca-Cola Company or its ticker symbol "KO" to a linked investment list. That is, the tool also does not permit a ticker descriptor for an investment or investment vehicle to be added efficiently to a linked investment list.

In various presently described embodiments, the computer system adds only a ticker symbol or only a name of the matching investment (but not both) to a linked investment list. In these embodiments, the linked investment list generally comprises either only ticker symbols or only names of investments, respectively.

In various other embodiments, if the computer system does not match the data entered (in its search(es) of one or more investment vehicle databases) to only a single ticker symbol or only a single other preassigned descriptor for an investment (e.g., the computer system makes multiple matches), the computer system may prompt the user to input and submit to the computer system from the data entry field a more precise "indication" for the investment (e.g., a valid ticker symbol or additional key words from a name for the company, mutual fund, ETF or, in some embodiments, option). On receipt of the requested more precise data, the computer system responsively runs (an) additional search(es) of one or more investment vehicle databases using the more precise data. If the computer system then finds only a single matching investment, the computer system adds the name of the matching investment (or its ticker symbol or both the name and the ticker symbol) to the linked investment list of the user.

In other embodiments, the computer system may prompt the user to submit a more precise indication for an investment one or more additional times if the computer system identifies multiple matches to ticker symbols or to other preassigned descriptors but the computer system does not identify only a single match to a ticker symbol (i.e., preassigned symbol) or other preassigned descriptor after (an) iteration(s) of prompting and receiving more precise indication(s) for an investment.

In various embodiments, if the computer system continues to identify multiple matches after providing one, two or more prompts to the user to submit a more precise descriptor (i.e., another "indication") for the investment, the computer system may then present to the user an output (e.g., a "Results Page"; see also FIGS. 9 & 10) of names of matching candidate investments (i.e., candidate companies, mutual funds, ETFs or, in some embodiments, options) or their ticker symbols [up to a maximum number—e.g., 45 candidate investments for each "Results Page" embodiment depicted in FIGS. 9 & 10] or both names of matching candidate investments and their ticker symbols. If the user simply selects the ticker symbol of the candidate investment that corresponds to the user's investment (or selects text of the name of the candidate investment, in some embodiments, or selects both a ticker symbol and a name) on a Results Page, the computer systems accepts the selection and adds the name of the investment or its ticker symbol or both to a linked investment list of the user.

FIG. 4 illustrates a web page (i.e., Financial Planning Questionnaire) where the user is notified of the operation of an integrated robust lookup tool at 448. In FIG. 4, the third row under Description or Ticker Symbol in the Financial Planning Questionnaire displays the entry "VGENX—VANGUARD ENERGY" at 449. This entry, which includes the valid ticker symbol "VGENX," is in contrast to the entries at 144 and 244 of FIGS. 1 and 2, respectively, in which "Other" was selected as the Investment Type for a position in "Vanguard Energy." This difference in entries is facilitated by the robust ticker symbol lookup capabilities that a system according to some embodiments makes available to a user who selects "Stock/Mutual Fund" as the Investment Type, coupled with the system's efficient addition of a ticker descriptor for an identified company or mutual fund to a linked investment list.

For example, the computer system may add to a linked investment list the ticker symbol and name of an investment when the entered indication matches only a single ticker symbol or only a single other preassigned descriptor of the investment after the computer system searches one or more investment vehicle databases; or, in response to a user selecting the ticker symbol for the company or fund that is identified from among several candidates on a "Results Page" or similar window, the computer system may add the ticker symbol and the name of the company represented by the ticker symbol to the linked investment list.

FIGS. 5-8 each illustrate a web page like that of FIG. 4, and each particularly depicts a drop-down menu. In FIG. 5, drop-down menu 542 for Type of Retirement Plan reveals that embodiments may be utilized to develop investment lists for retirement plans or account types that include, without limitation, Traditional IRA, Roth IRA, 401k, 403b, 457, SEP/SIMPLE IRA, Keogh, and Thrift Savings plans or accounts.

FIG. 6 provides the names of two individuals (i.e., Joe Smith and Jane Smith) in drop-down menu 642 listing potential account owners. Principles of embodiments are not limited to facilitating the creation of investment lists for accounts of individuals, but also embrace the development of investment lists for accounts of all types (whether real or simply desired) regardless of ownership (e.g., individual or corporate). FIG. 7 notes two time periods ("Monthly" and "Annually") in drop-down menu 742 with affirmative response selections to the heading Are any contributions made to this account? Principles of embodiments are similarly not limited to facilitating the creation of investment lists in response to any schedule of contributions to an account.

FIG. 8 is a Financial Planning Questionnaire in which the drop-down menu 842 under Investment includes the selection "Other" at 846. Although various embodiments allow a user to select "Other" as an Investment category, the robust ticker symbol lookup capabilities made available to a user who selects "Stock/Mutual Fund" as the Investment category, coupled with the efficiency with which an identified company or fund may be added to an investment list, makes selection of "Other" as an Investment category less attractive to users (nonetheless, "Other" is yet made available as an option in this embodiment as a "safety net" for the user, as well as to take away from the user a potential reason for failing to complete the Questionnaire, i.e., insufficient investment description categories).

In FIG. 9, ticker symbols and names of four mutual funds that include "vanguard energy" in the official name of the mutual fund are provided on this sample "Results Page." In various embodiments, the computer system may generate this Results Page after an entry of "vanguard energy" (or "VANGUARD ENERGY" or "Vanguard Energy"; entries are not case sensitive in various embodiments) is processed from a data entry field of the fourth row under Description or Ticker Symbol as shown in FIG. 8 (e.g., after the computer system, in responding to a selection of "ADD" button 850 adjacent to the data entry field, searched one or more investment vehicle databases using "vanguard energy"). In various embodiments, a user may cause the computer system to add any one of the four "Vanguard Energy" funds to the user's linked investment list simply by selecting the correct ticker symbol on the Results Page. The ticker symbol—mutual fund pair "VGENX—VANGUARD ENERGY" at 849 and 1149 in the third row under Description or Ticker Symbol in FIGS. 8 and 11, respectively, may have become part of the partially completed investment lists of these Questionnaires through a user selecting the ticker symbol "VGENX" at 951 in a Results Page similar to the one of FIG. 9.

A user may also modify (e.g., narrow) a search from a Results Page by adding another key word to a search phrase. For example, after accepting entry of "vanguard energy index" (i.e., after addition and entry of "index" after "vanguard energy") in the "Modify Search" field 952 of FIG. 9 (and after activation of the computer system to search one or more investment vehicle databases in response to a selection of the adjacent "Search" button), the computer system would typically identify a single match: the Vanguard Energy Index Fund Admiral Shares (ticker symbol VENAX). Consequently, in various embodiments, the computer system would add "VENAX—VANGUARD ENERGY INDEX FUND ADMIRAL SHARES" to the linked investment list.

In FIG. 10, ticker symbols and names of five companies that include "coca cola" in the company name are provided on a "Results Page." In various embodiments, the computer system may generate this Results Page after an entry of "coca cola" (or "COCA COLA" or "Coca Cola"; entries are not case sensitive in various embodiments) is processed from the data entry field of the fourth row under Description or Ticker Symbol as shown in FIG. 8 (e.g., after the computer system, in responding to a selection of the "ADD" button adjacent to the data entry field, searched one or more investment vehicle databases using "coca cola"). In various embodiments, a user may cause the computer system to add any one of these five companies to the user's linked investment list simply by selecting any one of the five ticker symbols of this Results Page. For example, if a user selected the ticker symbol "KO" at 1053 the computer system would add "KO—COCA COLA CO" to the user's investment list (as depicted at 1153 in the fourth row under Description or Ticker Symbol in FIG. 11; a user may also remove investment entries from an investment list like that of FIG. 11 by selecting a "Delete" button (or the like) adjacent to the entry to be deleted).

If a user also has a position in a second "Coca Cola" company, the user may again enter "Coca Cola" in a new data entry field (i.e., under a Description or Ticker Symbol field for which "Stock/Mutual Fund" has been selected as the Investment category in a Questionnaire like the one of FIG. 11). After another "Results Page" of five "Coca Cola" companies is returned in response to the user selecting the "ADD" button (or the like), the user can select the ticker symbol for the second "Coca Cola" company (or, in various embodiments, text of the name of the second "Coca Cola" company) on the "Results Page" and thereby trigger the computer system to add a position in that second "Coca Cola" company to a linked investment list.

As noted previously for FIG. 9, a user may also modify (e.g., narrow) a search from a Results Page by adding another key word to a search phrase. For example, after accepting entry of "coca cola enterprises" (i.e., after addition and entry of "enterprises" after "coca cola") in "Modify Search" field 1052 of FIG. 10 (and after activation of the computer system to search one or more investment vehicle databases in response to a selection of the adjacent "Search" button or the like), the computer system would typically identify a single match: Coca Cola Enterprises, Inc. (ticker symbol: CCE). Consequently, in various embodiments, the computer system would add "CCE—COCA COLA ENTERPRISES" to the linked investment list.

In FIG. 11, a CD (i.e., certificate of deposit) and three "Stock/Mutual Fund" investments are presented in a linked investment list of a Financial Planning Questionnaire. In contrast to the investments listed on the Retirement Plan Questionnaire of FIG. 2 (wherein two of the three stock/mutual fund positions are not identified by a ticker symbol), a ticker symbol is associated with each of the three "Stock/Mutual Fund" investments of FIG. 11. Again, this difference in entries is facilitated by the robust ticker symbol lookup capabilities that a system according to some embodiments makes available to a user who selects "Stock/Mutual Fund" as the Investment Type, coupled with the system's efficient addition of a ticker descriptor for an identified company or mutual fund to a linked investment list.

For some of the previously described embodiments, a robust ticker symbol lookup tool has been described as matching an entry of a user to ticker descriptor of a candidate investment where only an exact match (albeit possibly partial) exists. For example, a search using "vanguard energy" in a robust ticker symbol lookup tool may return a Results Page as depicted in FIG. 9 composed of four candidate investment vehicles for which "vanguard energy" is an exact match to part of the name of an investment fund of the Vanguard® Group, whether that investment fund be Vanguard Energy Fund Admiral Shares, Vanguard Energy Fund Investor Shares, Vanguard Energy Index Fund Admiral Shares, or Vanguard Energy VIPERS (see also Table 6, above).

However, embodiments also include ticker symbol lookup tools capable of generating a list of multiple candidate investment vehicles without an exact, complete match existing with characters of a search term that a user has entered (e.g., a misspelled word of the name of the candidate investment vehicle, or an inaccurately entered ticker symbol). That is, in various embodiments, a robust ticker symbol lookup tool may recognize candidate investment vehicles having ticker descriptors that only imperfectly match search characters that a user has entered (e.g., imperfect matches of 50%, 60%, 70%, 80%, 90%, 95%, 98% or 99% or more using a typical default parameter settings of a standard letter-matching algorithm wherein a character-to-character match over a search term or a database entry may be measured with or without gaps and with or without overhangs according to the typical default parameter settings). Such an embodiment of a robust ticker symbol lookup tool may output a list of candidate investment vehicles on a Results Page (e.g., a list ordered according to proximity to a 100% match to various ticker descriptors of candidate investment vehicles) despite no exact matches occurring with entries in databases of valid ticker symbols for, or key words in the names of, publicly-traded companies or funds. Furthermore, a ticker symbol, or name, or both a ticker symbol and a name for an investment vehicle selected from the output list of generated candidates may nonetheless be capable of being efficiently added to a user's linked investment list in such various embodiments (e.g., in response to the user placing a mouse click on the ticker symbol for, or a word in the name of, a candidate investment vehicle in the Results Page list).

Referring to FIG. 12, a block diagram illustrates an exemplary computer system 100 upon which process flows in accordance with principles of embodiments may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

One or more populating acts may be provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform processes described herein. One or more processors in a multi-processing arrangement may also be employed to execute the sequences of instructions contained in main memory 106. In other embodiments, hard-wired circuitry may be used in place of, or in combination with, software instructions. Thus, embodiments are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission can take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. One such downloaded application provides for, or participates in, robustly looking up ticker symbols for generation of a linked investment list as described herein for various embodiments. The received code may be executed by processor 104 as it is received, and/or stored in storage device 110, or other non-volatile storage for later execution. In this manner, computer system 100 may obtain application code in the form of a carrier wave.

Following long-standing patent law convention, the terms "a" and "an" mean "one or more" when used in this application, including the claims. Even though embodiments have been described with a certain degree of particularity, it is evident that many alternatives, modifications, and variations will be apparent to those skilled in the art in light of the present disclosure. Accordingly, it is intended that all such alternatives, modifications, and variations which fall within the spirit and scope of the described embodiments be embraced by the defined claims.

I claim:

1. A computer system for populating an investment list with at least one investment vehicle ticker descriptor, the system comprising a processor and a main memory each coupled with a bus wherein the bus is further linked with both an input device, for communicating information and command selections to the processor, and an output device, wherein the processor is programmed to perform acts comprising:

receiving an indication identifying an investment vehicle, and responsive to receipt of the indication, determining whether the indication matches a single enhanced ticker descriptor of an investment vehicle;

if the indication matches only the single enhanced ticker descriptor, adding to the investment list at least one of:

the enhanced ticker descriptor that matches the indication,
a ticker symbol of the investment vehicle represented by the enhanced ticker descriptor that matches the indication, and
a name of the investment vehicle represented by the enhanced ticker descriptor that matches the indication;

if the indication does not match only the single enhanced ticker descriptor, determining whether the indication matches only a single other preassigned descriptor;

if the indication matches only the single other preassigned descriptor, adding to the investment list at least one of:
the single other preassigned descriptor that matches the indication,
a ticker symbol of the investment vehicle represented by the single other preassigned descriptor that matches the indication, and
a name of the investment vehicle represented by the single other preassigned descriptor that matches the indication;

if the indication does not match only the single enhanced ticker descriptor or the single other preassigned descriptor, determining whether the indication matches multiple enhanced ticker descriptors, and, if the indication matches multiple enhanced ticker descriptors, generating an output of candidate investment vehicles comprising at least one of:
enhanced ticker descriptors that match the indication,
ticker symbols of the investment vehicles represented by the enhanced ticker descriptors that match the indication, and
names of the investment vehicles represented by the enhanced ticker descriptors that match the indication.

2. The computer system of claim 1 further programmed to perform acts comprising:
receiving a selection of a candidate investment vehicle from the generated output, and, responsive to the selection, adding to the investment list at least one of:
a ticker symbol of the selected candidate investment vehicle, and
a name of the selected candidate investment vehicle.

3. The computer system of claim 1, wherein the enhanced ticker descriptor is selected from the group consisting of: a word in a name of the investment vehicle, a ticker symbol for the investment vehicle, and a Committee for Uniform Security Identification Procedures (CUSIP) number for the investment vehicle.

4. The computer system of claim 1, wherein indications that are five letters long and end in the letter "X" must have 100% character identity (without gaps or overhangs) to the enhanced ticker descriptor in order to match.

5. The computer system of claim 1, wherein the adding to the investment list also includes adding information on market dollar value, or number of shares, of the investment vehicle represented by the investment vehicle ticker descriptor that matches the indication.

6. The computer system of claim 1, wherein the investment vehicle is traded on a stock exchange selected from the group consisting of: New York Stock Exchange (NYSE), American Stock Exchange (AMEX), and an electronic stock market originally known as the "National Association of Securities Dealers Automated Quotations" (NASDAQ).

7. A computer-readable medium comprising computer-executable instructions, which when executed by a computer, cause the computer to perform the following operations:

receiving an indication identifying an investment vehicle, and responsive to receipt of the indication, determining whether the indication matches a single enhanced ticker descriptor of an investment vehicle;

if the indication matches only the single enhanced ticker descriptor, adding to the
investment list at least one of:
the enhanced ticker descriptor that matches the indication,
a ticker symbol of the investment vehicle represented by the enhanced ticker descriptor that matches the indication, and
a name of the investment vehicle represented by the enhanced ticker descriptor that matches the indication;

if the indication does not match only the single enhanced ticker descriptor, determining whether the indication matches only a single other preassigned descriptor;

if the indication matches only the single other preassigned descriptor, adding to the investment list at least one of:
the single other preassigned descriptor that matches the indication,
a ticker symbol of the investment vehicle represented by the single other preassigned descriptor that matches the indication, and
a name of the investment vehicle represented by the single other preassigned descriptor that matches the indication;

if the indication does not match only the single enhanced ticker descriptor or the single other preassigned descriptor, determining whether the indication matches multiple enhanced ticker descriptors, and, if the indication matches multiple enhanced ticker descriptors, generating an output of candidate investment vehicles comprising at least one of:
enhanced ticker descriptors that match the indication,
ticker symbols of the investment vehicles represented by the enhanced ticker descriptors that match the indication, and
names of the investment vehicles represented by the enhanced ticker descriptors that match the indication.

8. The computer-readable medium of claim 7, further comprising computer-executable instructions which when executed by the computer, cause the computer to perform the following additional operations:
receiving a selection of a candidate investment vehicle from the generated output, and, responsive to the selection, adding to the investment list at least one of:
a ticker symbol of the selected candidate investment vehicle, and
a name of the selected candidate investment vehicle.

9. The computer-readable medium of claim 7, wherein the enhanced ticker descriptor is selected from the group consisting of: a word in a name of the investment vehicle, a ticker symbol for the investment vehicle, and a CUSIP number for the investment vehicle.

10. The computer-readable medium of claim 7, wherein indications that are five letters long and end in the letter "X" must have 100% character identity (without gaps or overhangs) to the enhanced ticker descriptor in order to match.

11. The computer-readable medium of claim 7, wherein the adding to the investment list also includes adding information on market dollar value, or number of shares, of the investment vehicle represented by the investment vehicle ticker descriptor that matches the indication.

12. The computer-readable medium of claim 7, wherein the investment vehicle is traded on a stock exchange selected from the group consisting of: NYSE, AMEX and NASDAQ.

13. A method for populating an investment list with at least one investment vehicle ticker descriptor, the method comprising:
- receiving an indication identifying an investment vehicle by a processor, and responsive to receipt of the indication, determining whether the indication matches a single enhanced ticker descriptor of an investment vehicle by the processor;
- if the indication matches only the single enhanced ticker descriptor, adding to the investment list at least one of:
    - the enhanced ticker descriptor that matches the indication,
    - a ticker symbol of the investment vehicle represented by the enhanced ticker descriptor that matches the indication, and
    - a name of the investment vehicle represented by the enhanced ticker descriptor that matches the indication;
- if the indication does not match only the single enhanced ticker descriptor, determining whether the indication matches only a single other preassigned descriptor by the processor;
- if the indication matches only the single other preassigned descriptor, adding to the investment list at least one of:
    - the single other preassigned descriptor that matches the indication,
    - a ticker symbol of the investment vehicle represented by the single other preassigned descriptor that matches the indication, and
    - a name of the investment vehicle represented by the single other preassigned descriptor that matches the indication;
- if the indication does not match only the single enhanced ticker descriptor or the single other preassigned descriptor, determining whether the indication matches multiple enhanced ticker descriptors by the processor, and, if the indication matches multiple enhanced ticker descriptors, generating an output of candidate investment vehicles comprising at least one of:
    - enhanced ticker descriptors that match the indication,
    - ticker symbols of the investment vehicles represented by the enhanced ticker descriptors that match the indication, and
    - names of the investment vehicles represented by the enhanced ticker descriptors that match the indication.

14. The method of claim 13 further comprising:
- receiving a selection of a candidate investment vehicle from the generated output by the processor, and, responsive to the selection, adding to the investment list at least one of:
    - a ticker symbol of the selected candidate investment vehicle,
    - and a name of the selected candidate investment vehicle.

15. The method of claim 13, wherein the enhanced ticker descriptor is selected from the group consisting of: a word in a name of the investment vehicle, a ticker symbol for the investment vehicle, and a CUSIP number for the investment vehicle.

16. The method of claim 13, wherein indications that are five letters long and end in the letter "X" must have 100% character identity (without gaps or overhangs) to the enhanced ticker descriptor in order to match.

17. The method of claim 13, wherein the adding to the investment list also includes adding information on market dollar value, or number of shares, of the investment vehicle represented by the investment vehicle ticker descriptor that matches the indication.

* * * * *